United States Patent [19]
Muramatsu et al.

[11] Patent Number: 4,547,046
[45] Date of Patent: Oct. 15, 1985

[54] ELECTROCHROMIC DISPLAY DEVICE

[75] Inventors: Hiromochi Muramatsu, Nagoya; Atsushi Watanabe, Toyokawa; Kunihiko Hara, Aichi, all of Japan

[73] Assignee: Nippondenso Co., Ltd., Kariya, Japan

[21] Appl. No.: 464,862

[22] Filed: Feb. 8, 1983

[30] Foreign Application Priority Data

Feb. 10, 1982 [JP] Japan .................. 57-20164

[51] Int. Cl.⁴ .............................. G02F 1/23
[52] U.S. Cl. .................................. 350/357
[58] Field of Search ................. 350/355, 357

[56] References Cited

U.S. PATENT DOCUMENTS

| | | | |
|---|---|---|---|
| 3,864,589 | 2/1975 | Schoot et al. | 350/357 |
| 4,146,876 | 3/1979 | Arellano et al. | 350/357 |
| 4,253,742 | 3/1981 | Morita | 350/357 |

Primary Examiner—Bruce Y. Arnold
Attorney, Agent, or Firm—Cushman, Darby & Cushman

[57] ABSTRACT

An electrochromic display device for use in automobiles, etc. comprises a plurality of mutually parallel strip-shaped display electrodes, a plurality of mutually parallel strip-shaped opposite electrodes, electrochemically-color-developing solid layers, solid electrolyte layers as intermediate layers, and an electrically insulating layer. The display electrodes and the opposite electrodes are arranged so as to three-dimensionally intersect each other. The electrochemically-color-developing solid layers and the solid electrolyte layers are present only at the spaces formed by the intersection between the display electrodes and the opposite electrodes. The electrically insulating layer occupies all portions other than the electrodes, electrochemically-color-developing solid layers and solid electrolyte layers within the device.

7 Claims, 1 Drawing Figure

U.S. Patent  Oct. 15, 1985  4,547,046
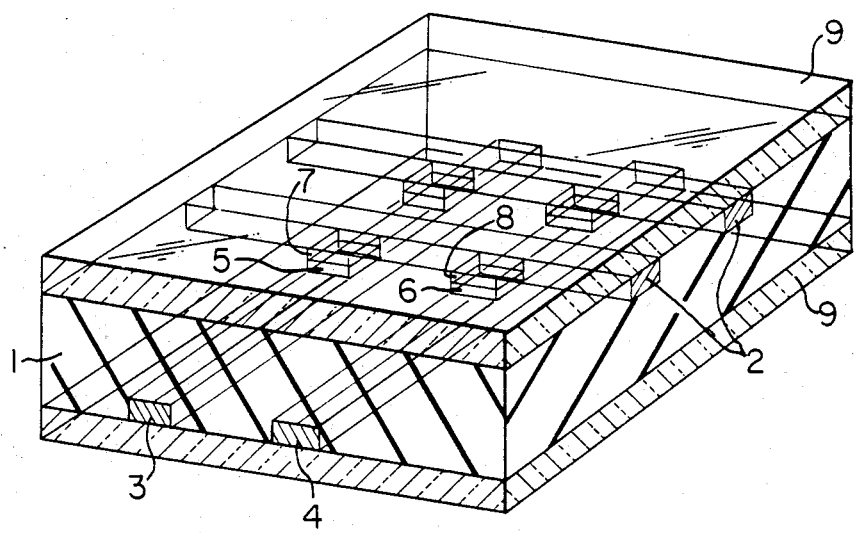

ELECTROCHROMIC DISPLAY DEVICE

BACKGROUND OF THE INVENTION

1. Field of the Invention

This invention relates to an electrochromic display device. More particularly, it relates to an electrochromic display device used, for example, in dashboards of automobiles, etc., which contains a matrix of coincident selection display elements capable of selectively coloring when electrified, thereby providing various pattern displays.

2. Description of the Prior Art

In conventional electrochromic display devices, display electrodes are provided on a substrate in the form of dots so as to form a pattern and a lead electrode is connected to each of these dot electrodes, while, as opposite electrodes, there can be used either a sheet-like electrode common to all dot electrodes, or electrodes provided in the form of dots corresponding to respective dots of display electrodes. In the latter case, a lead electrode must be connected to each dot, as in the case of display electrodes.

In the structures of some of said conventionl electrochromic display devices, both the display electrodes and opposite electrodes are provided in the form of dots so as to form a pattern and lead electrodes need to be connected to all of these dots. Therefore, the structure becomes complex and the lead electrodes are increased in number and inevitably become thinner. As a result, the electrical resistance of each lead electrode is increased and the quantity of the electric current flowing through the lead electrodes becomes reduced, which affects both the response time and contrast of pattern.

SUMMARY OF THE INVENTION

The object of this invention is to provide an electrochromic display device free from the drawbacks of the conventional devices, giving a good response and a sharp contrast with no color unevenness and causing no cross-talk phenomenon.

According to this invention, there is provided an electrochromic display device which comprises (a) a plurality of mutually parallel strip-shaped display electrodes, (b) a plurality of mutually parallel strip-shaped opposite electrodes, said display electrodes and said opposite electrodes being arranged so as to three-dimensionally intersect each other; (c) electrochemically-color-developing layers; (d) electrolyte layers as intermediate layers, said layers (of (c) and of (d)) existing between said electrodes (of (a) and of (b)) only at the spaces formed by the intersection of the electrodes of (a) and (b); and (e) an electrically insulating layer occupying all portions inside the device, other than (a), (b), (c) and (d).

In this invention, it is not necessary to use electrodes provided in the form of dots so as to form a pattern and, moreover, the number of lead electrodes can be decreased considerably, compared with that in the conventional devices. Accordingly, providing a desired pattern becomes easier and the production efficiency of the devices can be enhanced. Furthermore, because of fewer lead electrodes, the use of thin lead electrodes, which was necessary in the conventional electrochromic display devices, becomes unnecessary, whereby both the response and contrast of pattern can be improved. Furthermore, as an important feature of the present device, no cross-talk occurs.

The electrochromic display panel obtained according to this invention can be used for various applications such as meters to be mounted on automobiles, graphic displays, etc. It is possible to simultaneously exhibit plural information on one display panel.

BRIEF DESCRIPTION OF THE DRAWING

The drawing attached hereto is a partially enlarged sectional perspective view showing an electrochromic display device of a transparent type as an embodiment of this invention.

DETAILED DESCRIPTION OF PREFERRED EMBODIMENTS

This invention will be illustrated hereinunder in detail referring to the drawing.

The drawing shows a partially enlarged sectional perspective view of an example of an electrochromic display device of a transparent type according to this invention. The display device according to this invention comprises a plurality of mutually parallel strip-shaped display electrodes 3 and 4, a plurality of mutually parallel strip-shaped opposite electrodes 2, said display electrodes 3 and 4 and said opposite electrodes 2 being arranged so as to three-dimensionally intersect each other, electrochemically-color-developing layers 5 and 6 and electrolyte layers 7 and 8 as intermediate layers, said layers 5, 6, 7 and 8 existing between said display electrodes 3 and 4 and said opposite electrodes 2 only at the spaces formed by the intersection between these two kinds of electrodes 3 and 4 and electrodes 2, and an electrically insulating material 1 occupying all portions other than the elements 2, 3, 4, 5, 6, 7 and 8 within the device. The device may be covered by upper and lower substrates 9 and, since the display device shown in the drawing attached is of a transparent type, both the substrates are musts therefore be transparent.

Materials constituting portions 1 to 9 are already known and can be optionally selected. For example, the strip-shaped display electrodes and strip-shaped opposite electrodes may be composed of electroconductive inorganic oxides such as indium oxide ($In_2O_3$) and/or tin oxide ($SnO_2$). These electrodes may further contain, if necessary, antimony (Sb), cadmium (Cd) or lead (Pb). The electrochemically-color-developing layers may be produced from a substance such as tungsten trioxide, molybdenum trioxide or indium trioxide. The electrolyte layers as intermediate layers may be produced from a highly dielectric material such as lithium iodide (LiI), lithium nitride ($Li_3N$), magnesium fluoride ($MgF_2$) or calcium fluoride ($CaF_2$); a solid electrolyte such as sodium $\beta$-alumina ($Na-\beta-Al_2O_3$); or a paste-like mixture such as urea, p-toluenesulfonic acid and glycerol. These two kinds of layers are produced by a process such as an electron beam process, vapor deposition process or a sputtering or spraying process. The transparent weight substrates 9 may be produced from glass or a high molecular substance film. Two substrates (upper and lower) may be used as shown in the drawing, however, either of them may be eliminated as necessary.

An electrically insulating material constituting the electrically insulating layer 1 may be an inorganic material such as silica ($SiO_2$) or yttria ($Y_2O_3$) or may be an organic material such as an epoxy or a silicone. A silica insulating layer can be formed of the vapor deposition process or the sputtering process and an epoxy or silicone resin insulating layer can be formed by a screen printing process.

The thickness of each layer may be optionally selected within the thickness ranges of respective conventional techniques.

A specific example of this invention will be illustrated referring again to the drawing.

On a transparent glass substrate 9 having a thickness of 1.1 mm, there was vapor-deposited a transparent electroconductive film having a thickness of 400 Å composed of 5% of $SnO_2$ and 95% of $In_2O_3$. On this film, there was formed a pattern of parallel strips by photoetching. After etching the film, the photoresist mask was removed. Thus, the parallel strip-shaped electrodes 3 and 4 were formed on the substrate 9. Then, on the substrate 9 and the strip-shaped electrodes 3 and 4, there was formed an insulating layer of $SiO_2$ by the vacuum deposition process, and subsequently a photoresist film was produced on the whole area of the insulating layer, and a plurality of dots positioned on the strip-shaped electrodes 3 and 4 were etched to remove the insulating layer at the dots and subsequently the photoresist mask was removed. Then, a $WO_3$ film having a thickness of 3000 Å was vapor-deposited on the insulating layer and the exposed part of the electrodes corresponding to the above dots. A photoresist film was formed on the part of the $WO_3$ film positioned at the above dots of the electrodes. Etching was conducted to remove the $WO_3$ film on the insulating layer and subsequently the photoresist mask was removed, whereby electrochemically-color-developing layers 5 and 6 were formed in the form of dots on the strip-shaped electrodes 3 and 4. Then, an electrolyte layer of $MgF_2$ having a thickness of 3000 Å was formed on the insulating layer and the electrochemically-color-developing layers 5 and 6. A photoresist film was formed on the part of the electrolyte layer on the electrochemically-color-developing layers 5 and 6. Etching was conducted to remove the electrolyte layer on the insulating layer and the photoresist mask was removed, whereby electrolyte layers 7 and 8 as intermediate layers were formed on the color-developing layers 5 and 6, respectively. Thus, on each strip-shaped electrode were formed a color-developing layer and an electrolyte layer as intermediate layers. On the insulating layer and the electrolyte layers, there was vapor-deposited a transparent electroconductive film. Using the photoetching process, the electroconductive film was converted to parallel strip-shaped opposite electrodes 2 which contact with the electrolyte layers and three-dimensionally intersect the strip-saped electrodes 3 and 4 at an angle of 90°. Finally, the insulating layer and the opposite electrodes 2 were covered with a transparent substrate 9. The insulating layer 1 occupied all spaces between the upper and lower substrates and had a thickness of 6800 Å.

In the display device obtained as above, when a voltage was applied between the electrodes 2 and 3, the electrochemically-color-developing layers 5 displayed a blue color.

When the polarity was changed between the electrodes 2 and 3, the color disappeared. In this display device, there was no cross-talk. That is, the electric current flowed normally (2→7→5→3) and there was no abnormal current flow due to leakage (e.g. 2→8→6→4) and accordingly no color-developing of unintended dots.

What is claimed is:

1. An electrochromic display device having two principal sides and comprising:
   a plurality of mutually parallel strip-shaped display electrodes,
   a plurality of mutually parallel strip-shaped opposite electrodes,
   said display electrodes and said opposite electrodes arranged so as to be in prallel planes, respectively, and wherein the strips of said strip-shaped display electrodes and of said strip-shaped opposite electrodes are inclined to one another,
   electrochemcially-color-developing solid layers and solid electrolyte layers as intermediate layers, both said types of layers laminated by the areas formed by the intersection between the display electrodes and opposite electrodes, and
   an electrically insulating material occupying all portions inside the device other than those occupied by said strip-shaped display electrodes, said strip-shaped opposite electrodes, said electrochemically-color-developing layers and said electrolyte layers.

2. The electrochromic display device according to claim 1, wherein at least one side of the display device is supported by a transparent or opaque substrate.

3. The electrochromic display device according to claim 2, wherein said substrate is made of glass or a high molecular weight organic material.

4. The electrochromic display according to claim 1, wherein said strip-shaped display electrodes and strip-shaped opposite electrodes comprise one or more electroconductive inorganic oxides selected from the group consisting of indium oxides and tin oxides and optionally contain antimony, cadmium or lead.

5. The electrochromic display device according to claim 1, wherein said electrically-color-developing layers comprise one or more materials selected from the group consisting of tungsten trioxide, molybdenum trioxide and indium trioxide.

6. The electrochromic display device according to claim 1, wherein said electrolyte layers comprise one or more materials selected from the group consisting of lithium iodide, lithium nitride, magnesium fluoride, calcium fluoride, sodium $\beta$-alumina and a paste-like mixture comprising urea, p-toluenesulfonic acid and glycerol.

7. The electrochromic display device according to claim 1, wherein said electrically insulating layer comprises an epoxy resin or a silicone resin.

* * * * *